April 24, 1928.

W. H. RICE 1,667,051

AUTOMOBILE TIRE AIR PUMP

Filed Dec. 2, 1924

INVENTOR.
W. H. Rice
BY
ATTORNEY.

Patented Apr. 24, 1928.

1,667,051

UNITED STATES PATENT OFFICE.

WILLIAM H. RICE, OF EAST ST. LOUIS, ILLINOIS.

AUTOMOBILE TIRE AIR PUMP.

Application filed December 2, 1924. Serial No. 753,480.

The invention relates to inflating devices for pneumatic tires and particularly to inflating devices whereby pneumatic tires of automobiles may be inflated, while the automobile is moving, as well as at rest. Small leaks in automobile tires are a prolific source of annoyance and accidents, and heretofore it has been necessary to stop the automobile, and with the use of a conventional form of hand air pump, replenish the air supply in the tires. However this means of inflating tires is a disagreeable task and involves considerable loss of time, consequently for this reason small leaks are not taken care of, and the tire becomes flat and is very often a direct cause of an accident.

A further object is to provide in combination with an automobile wheel a plate having an annular channel therein rotatable with the wheel and secured thereto, preferably within the brake band drum, and a ring slidably mounted in the channel and stationary, and through which ring air is supplied to the annular channel, and to a pneumatic tire through a pipe connection between the tire valve and the annular channel.

A further object is to provide the annular ring with an air supply pipe, which extends outwardly through an annular flange carried by the ring, which flange is slidably mounted between concentrically arranged annular plates. Also to provide a clamping member adapted to clamp on the axle housing and formed from segmentally shaped separable sections, one of said sections being provided with outwardly extending U-shaped members through which the air supply pipe extends and also a lug carried by the ring, and which clamping member prevents rotation of the ring with the wheel carried disc.

A further object is to provide the slidable ring with endless circuitous oil grooves in its inner and outer periphery for lubricating said peripheries and with branch angular oil passages in communication with the lubricant chamber for lubricating the outer face of the ring.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:—

Figure 1:
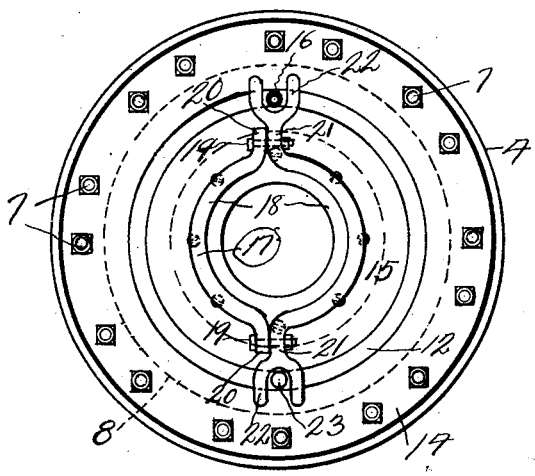
Figure 1 is a view in elevation of the device.
Figure 2:
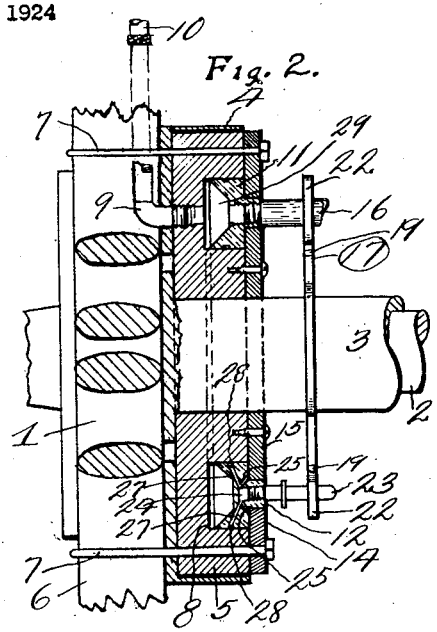
Figure 2 is a vertical longitudinal sectional view through the device.
Figure 3:
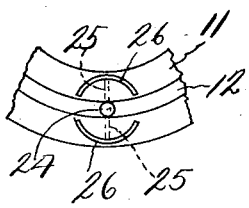
Figure 3 is a view in elevation of a portion of the outer face of the ring showing lubricant passages.
Figure 4:
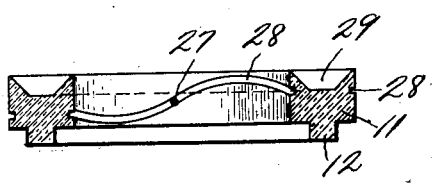
Figure 4 is a horizontal sectional view through the ring.
Figure 5:
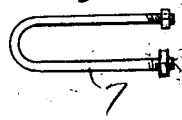
Figure 5 is a plan view of one of the U-shaped bolts.

Referring to the drawing the numeral 1 designates a conventional form of automobile wheel, 2 a drive axle and 3 the axle housing which is stationary during the rotation of the wheel 1. The inner side of the wheel 1 is provided with a conventional form of brake drum 4, in which is disposed a round plate 5. The plate 5 is secured to the spokes 6 of the wheel 1 by means of U-shaped bolts 7, which extend through the brake drum 1, plate 5 and arch the spokes 6. Plate 5 rotates with the wheel 1, and is provided with an annular air chamber 8, into which air is forced through mechanism hereinafter set forth, however a discharge pipe 9 is connected to the plate 5 in communication with the annular air chamber 8, and which discharge pipe leads to a conventional form of tire valve 10 for inflating the tire. Slidably mounted in the chamber 8 is a ring 11, which ring has a close sliding engagement with the walls of the air chamber 8 and is provided with an annular flange 12 which extends outwardly between the concentrically arranged rings 14 and 15, secured to the outer side of the drums, and which rings engage the outer side of the slidable ring 11 and maintain the same in proper position within the air chamber 8. Air is supplied to the air chamber 8 by means of an air supply pipe 16, which may lead to a pump or other source of supply controllable by the operator within the automobile, therefore it will be seen that air may be supplied to the inflating valve 10 by the operator while the automobile is in motion or standing still, and consequently the tires may be maintained inflated at all times, and the necessity and inconveniences of stopping the automobile and using an air pump is obviated. Ring 11 is held against rotation with the wheel 1 and plate 5 by means of a clamping member 17, and which clamping member is formed from segmentally shaped oppositely disposed members 18 secured together by means of bolts 19, which extend through the outwardly extending arms 20 and 21 of the segmentally shaped members. The arms 21 of one of the segmentally shaped members terminate in bifurcated members 22 through which the air supply pipe 16 and a removable pin 23 extend, therefore it will be seen that when the clamping member is securely clamped to the axle housing 3, the bifurcated members 22 will hold the slidable ring 11 against rotation during the rotation of the wheel and the disc 5, consequently the supply pipe 16 will not be wrapped around the axle, or broken.

The pin 23 is threaded into the chamber 24, and when it is desired to lubricate the ring 11 for insuring proper movement of the parts and reducing the friction to a minimum, the pin is removed and lubricant placed in the chamber 24, and from which chamber said lubricant passes through the oil passages 25 to the arcuate oil passages 26 on the outer face of the ring 11, thereby distributing oil between the outer face of the ring 11, and the inner faces of the rings 14 and 15. Oil is distributed from the oil chamber 24 to the inner and outer peripheries of the ring 11 through oil passages 27, which discharge into endless circuitous oil channels 28 in the inner and outer peripheries of the slidable ring, therefore the inner and outer peripheries of the slidable ring are thoroughly lubricated at all times, as the circuitous passage distribute the oil over their entire surfaces and the surfaces of the air chamber 8 which they engage. The inner face of the ring 11 is provided with an annular channel 29 which forms a portion of the air chamber 8, therefore it will be seen that the air chamber is relatively large and at the same time air will be supplied to the air discharge pipe 9 from the chamber 8 irrespective of the relative positions of the air supply pipe 16 and discharge pipe 9.

From the above it will be seen that an inflating means is provided for automobile tires, which is carried by an automobile wheel, and one constructed in a manner whereby air may be supplied to the automobile tire while in motion, thereby obviating stopping of the automobile for inflating the tires. Although the device has been described and shown in connection with a single wheel, it is to be understood that the same may be applied to all the wheels of an automobile if desired.

The invention having been set forth what is claimed as new and useful is:—

The combination with a rotatable wheel, an air pipe carried by said wheel, a stationary air supply pipe, of means for supplying air from the supply pipe to the wheel carried air pipe during the rotation of the wheel, said means comprising a plate secured to the wheel and rotatable therewith and provided with an annular air chamber, a ring slidably mounted in said air chamber and having an annular channel in the inner side thereof, said air supply pipe discharging into the air chamber through the ring and connected to the ring, an air supply pipe carried by said ring, a yoke clamped to a stationary support, said yoke being provided with bifurcations, a pin carried by said slidable ring, said pin and air supply pipe carried by the ring extending through the bifurcations of the yoke.

In testimony whereof I affix my signature.

WILLIAM H. RICE.